C. B. ALBREE.
CONNECTING DEVICE.
APPLICATION FILED SEPT. 7, 1909.

1,006,895.

Patented Oct. 24, 1911.

WITNESSES
R. A. Balderson
Walter Jamariss

INVENTOR
C. B. Albree,
by Bakewell, Byrnes & Parmelee,
his Attys.

UNITED STATES PATENT OFFICE.

CHESTER B. ALBREE, OF PITTSBURGH, PENNSYLVANIA, ASSIGNOR TO CHESTER B. ALBREE IRON WORKS, OF PITTSBURGH, PENNSYLVANIA, A CORPORATION OF PENNSYLVANIA.

CONNECTING DEVICE.

1,006,895.

Specification of Letters Patent. Patented Oct. 24, 1911.

Application filed September 7, 1909. Serial No. 516,316.

*To all whom it may concern:*

Be it known that I, CHESTER B. ALBREE, of Pittsburgh, Allegheny county, Pennsylvania, have invented a new and useful Connecting Device, of which the following is a full, clear, and exact description, reference being had to the accompanying drawings, forming part of this specification, in which—

Figure 1:
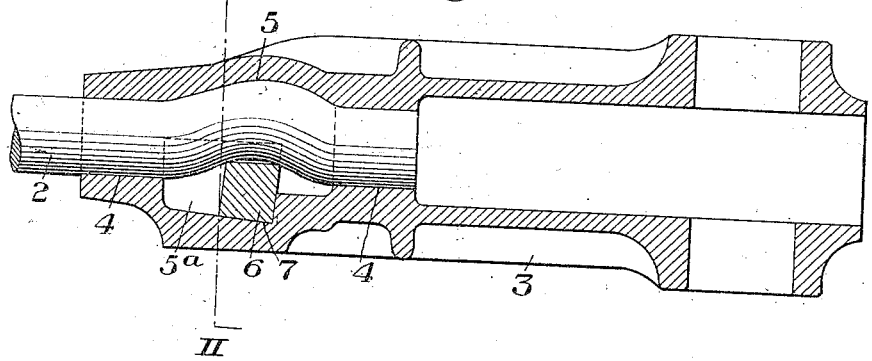
Figure 2:
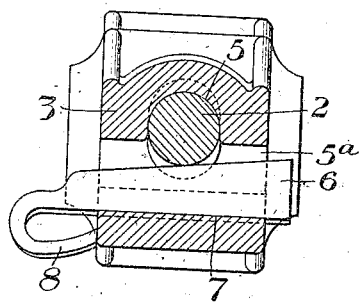
Figure 3:
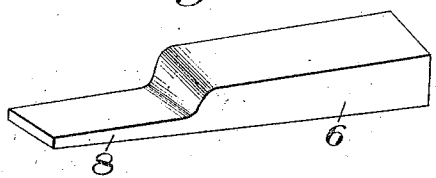

Figure 1 is a longitudinal section showing one form of my device; Fig. 2 is a section on the line II—II of Fig. 1; and Fig. 3 is a perspective view of the wedge.

My invention has relation to devices for connecting rods, ropes, or cables to other members, such as clevises, hooks, brake forks and the like; and is designed to provide a simple and effective device of this character by means of which a secure connection can be quickly and easily effected between the members to be connected.

A further object of the invention is, to provide a device of this kind of such a character that the connection may be made without the use of special tools and in the field, shop work not being necessary.

The nature of my invention will be best understood by reference to the accompanying drawings, in which I have shown one embodiment thereof, and which will now be described, it being premised, however, that various changes may be made in the details of construction and arrangement of the parts without departing from the spirit and scope of my invention as defined in the appended claims.

In these drawings, the numeral 2 designates a rod, and 3 is a member to which the rod is to be connected. In the present instance, the member 3 is shown as consisting of a brake fork, but this is immaterial to my invention, since such member may be a clevis, a loop member, a hook member, or any other device to which it may be desired to connect a rod. In accordance with my invention, the member 3 is provided with a longitudinally-extending opening 4 for the rod 2, said opening being interiorly enlarged at an intermediate portion thereof, as shown at 5. Opposite this interior enlargement, or offset, is formed a transverse key seat 5ª for a key or wedge member 6. This key or wedge member is not only tapered longitudinally, but is also preferably tapered transversely; and the bottom wall 7 of the seat 5ª is also preferably inclined in a direction to lessen the depth of the key seat toward the free end of the member 3. The wedge is also preferably formed with a thinned extension 8, as shown in Figs. 2 and 3.

In making the connection, the end of the rod 2 is inserted into the opening 4, and the key or wedge 6 is then entered and driven transversely underneath the rod, as shown in Figs. 1 and 2. The space between the bottom wall 7 of the key seat and the rod being less than the thickness of the wedge, the effect of driving the wedge is to buckle or bend the rod upwardly into the interior offset 5, thereby securely fastening the rod in place. Any pull on the members tending to separate the same tends to move the wedge upwardly along the inclined wall 7 and thus tightening its grip upon the rod.

The offset or enlargement 5 of the opening 4 is preferably of such shape that a pronounced and more or less abrupt offset will be made in the rod 2, so as to afford a very secure lock for holding the rod under pulling strains.

It will be seen that the manner in which the rod is bent by the key or wedge causes it to engage the wedge in such a manner that a pull on the rod will tend to draw the wedge with it and thus tighten the wedge and its grip upon the rod. For the purpose of securing the wedge in place and preventing any accidental displacement thereof, the thinned end portion 8 may be bent over against the side of the member 3 in the manner shown in Fig. 2 and thus securely lock the wedge in place. This can be readily done with a hammer, no special tools being required in effecting the connection.

The invention is also applicable to securing the ends of ropes or cables, the end portion of the rope or cable being forced into the interior offset of the socket member by the action of the wedge or key.

The advantages of my invention result from the extreme simplicity of the means employed to form the connection, and from the fact that a secure connection can be readily effected without the use of special tools and without shop work of any kind.

It will be obvious that the form of the socket member, and the form of the key or wedge seat and of the key or wedge may be changed without departing from my invention, since

What I claim is:—

1. The combination with a socket or sleeve member, having a longitudinal opening therein, one wall of said opening having an outward offset and the opposite wall having a seat for a locking device, of a second member inserted in said opening and having a portion forced into said offset, and a locking wedge arranged to be driven into said seat, the seat being wider than the wedge, whereby the wedge is capable of movement in its seat in the direction of the longitudinal axis of the socket or sleeve upon the slip of the second member to increase its grip thereon, substantially as described.

2. The combination with a socket or sleeve member, having a longitudinal opening therein, one wall of said opening having an outward offset and the opposite wall having a seat for a locking device, of a second member inserted in said opening and having a portion forced into said offset, and a locking wedge arranged to be driven into said seat, the seat being wider than the wedge, whereby the wedge is capable of movement in its seat in the direction of the longitudinal axis of the socket or sleeve upon the slip of the second member to increase its grip thereon, said seat having an inclination toward the second member in the direction of movement of the locking device, substantially as described.

3. The combination with a socket or sleeve member having a longitudinal opening therein, one wall of said opening having an outward offset and the opposite wall having a seat for a locking device, of a second member inserted in said opening and having a portion forced into said offset, and a locking wedge arranged to be driven into said seat, the seat being wider than the wedge whereby the wedge is capable of movement in its seat in the direction of the longitudinal axis of the socket or sleeve upon the slip of the second member to increase its grip thereon, together with positive means for securing the locking device against accidental release movement, substantially as described.

In testimony whereof, I have hereunto set my hand.

CHESTER B. ALBREE.

Witnesses:
GEO. H. PARMELEE,
H. M. CORWIN.